US005103492A

United States Patent [19]

Ticknor

[11] Patent Number: 5,103,492

[45] Date of Patent: Apr. 7, 1992

[54] ELECTRO-OPTIC CHANNEL SWITCH

[75] Inventor: Anthony J. Ticknor, Cupertino, Calif.

[73] Assignee: Lockheed Missiles & Space Company, Inc., Sunnyvale, Calif.

[21] Appl. No.: 659,543

[22] Filed: Aug. 24, 1990

Related U.S. Application Data

[63] Continuation of Ser. No. 292,855, Jan. 3, 1989, abandoned.

[51] Int. Cl.[5] .............. G02B 6/10
[52] U.S. Cl. .............. 385/9
[58] Field of Search .............. 350/96.14

[56] References Cited

U.S. PATENT DOCUMENTS

| | | | |
|---|---|---|---|
| 4,181,399 | 1/1980 | McMahon et al. | 350/96.14 |
| 4,203,649 | 5/1980 | Velasco et al. | 350/96.14 |
| 4,222,638 | 9/1980 | Robert | 350/96.14 |
| 4,389,567 | 6/1983 | Khoe et al. | 350/96.14 |
| 4,561,718 | 12/1985 | Nelson | 350/96.14 |
| 4,583,817 | 4/1986 | Papuchon | 350/96.14 |

*Primary Examiner*—William L. Sikes
*Assistant Examiner*—Robert E. Wise
*Attorney, Agent, or Firm*—H. Donald Volk; John J. Morrissey

[57] ABSTRACT

An optical signal propagated through a poled-polymer input channel waveguide can be switched to a selected one of a pair of poled-polymer output channel waveguides, while producing only very low cross-talk in the unselected one of the output channel waveguides. The input and output channel waveguides are located within a non-linear optical polymer structure so that an end portion of the input channel waveguide is disposed between end portions of the two output channel waveguides. A first pair of electrodes is positioned so as to apply an electric field across one of the output channel waveguides, and a second pair of electrodes is positioned so as to apply an electric field across the other of the output channel waveguides. The first and second pairs of electrodes can be selectively energized so as to superimpose field-dependent changes upon the index of refraction in either of the output channel waveguides, thereby enabling the signal in the input channel waveguide to be resonantly coupled to either one of the output channel waveguides as desired.

2 Claims, 2 Drawing Sheets

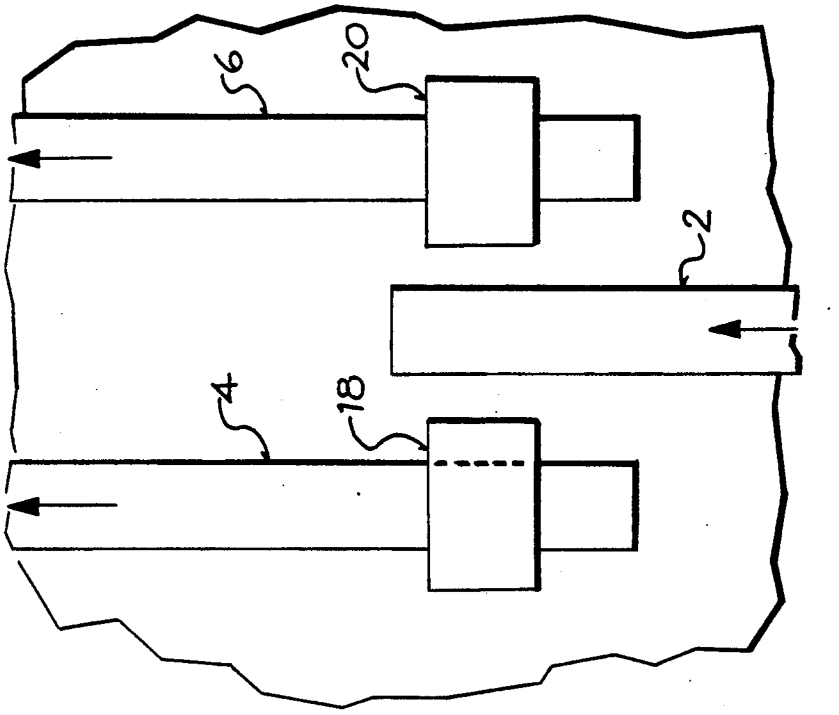
FIG_2
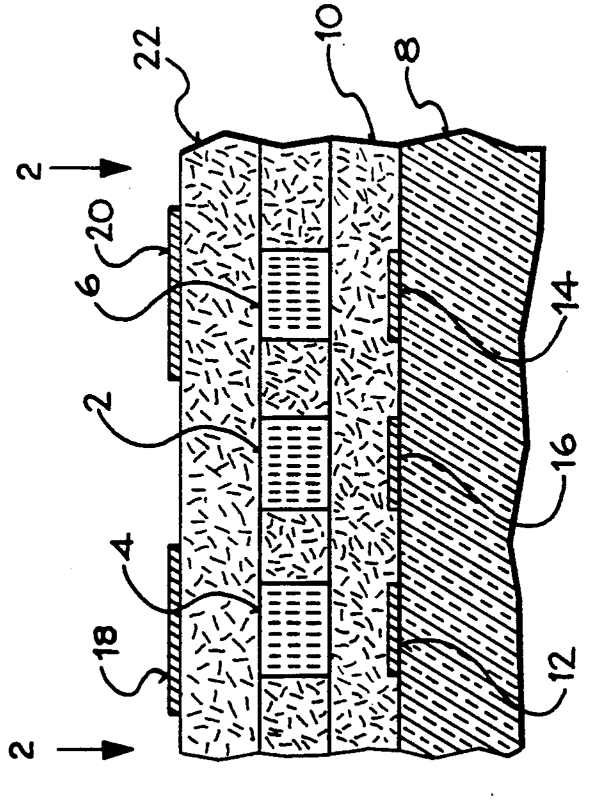
FIG_1

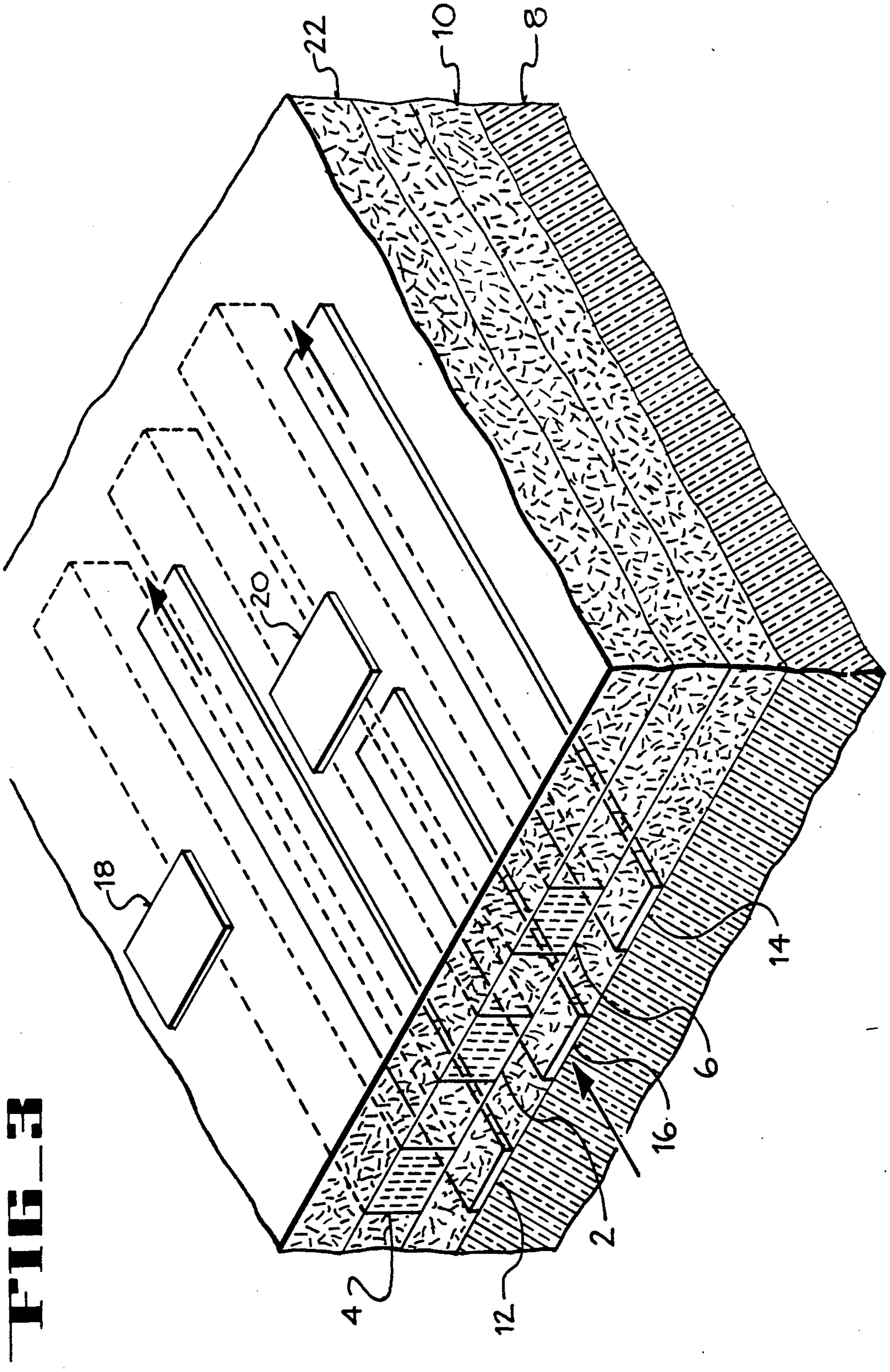
FIG_3

ELECTRO-OPTIC CHANNEL SWITCH

The Government has rights in this invention pursuant to Contract DAAL01-85-C-0197 awarded by the Department of the Army.

This is a continuation of patent application Ser. No. 292,855 filed on Jan. 3, 1989, which is now abondoned.

TECHNICAL FIELD

An electro-optic channel waveguide is a three-dimensional optical waveguide formed as a channel in a structure made of non-linear optical material and having utility in transporting selected modes of optical radiation of desired polorization. An electro-optic channel waveguide as a higher index of refraction for at least one polarization in at least one direction than the index of refraction of portions of any media adjacent the channel waveguide. Techniques for fabricating three-dimensional optical waveguides made of thin-film polymer materials are described in U.S. Pat. No. 4,767,169 assigned to Hoechst-Celanese Corporation.

A method of forming an electro-optic channel waveguide in a polymer structure is described in co-pending U.S. patent application Ser. No. 225,450, entitled "Electro-Optic Channel Waveguide", assigned to Hoechst-Celanese Corporation and to Lockheed Missiles & Space Company, Inc.

SUMMARY OF THE INVENTION

An electro-optic channel waveguide switch according to the present invention comprises a non-linear optical polymer structure, within which a plurality of electro-optic channel waveguides are permanently formed. A set of electrodes is positioned on the polymer structure in such a way that an electric field can be applied across a selected one of the channel waveguides formed therein. In operation, an optical signal propagated in a first one of the electro-optic channel waveguides can be selectively switched to either one of a second or a third adjacent electro-optic channel waveguide in the polymer structure. Switching of the optical signal from the first channel waveguide to the selected second or third adjacent channel waveguide is accomplished by applying an appropriate electric field across the selected adjacent channel waveguide to change the index of refraction of the selected channel waveguide, thereby altering the effective coupling of the selected adjacent channel waveguide to the first waveguide.

In an exemplary embodiment of the present invention as illustrated in the drawing, the first, second and third channel waveguides are sized to provide a half-wave resonance between the first channel waveguide and each of the second and third channel waveguides when no electric field is applied across either of the second and third channel waveguides. The electric field that is applied across the selected one of the second and third channel waveguides produces a sufficient change in the index of refraction of the selected channel waveguide to cause a phase shift of approxmiately 180° in the selected channel waveguide, thereby switching the optical signal from the first channel waveguide into the selected second or third channel waveguide.

DESCRIPTION OF THE DRAWINGS

FIG. 1 is a fragmentary cross-sectional view of a non-linear optical polymer structure in which an end portion of a first channel waveguide is shown interposed between end portions of a pair of adjacent channel waveguides, and in which in accordance with the present invention a first pair of switching electrodes is positioned adjacent the end portion of one member of the pair of adjacent channel waveguides and a second pair of switching electrodes is positioned adjacent the end portion of the other member of the pair of adjacent channel waveguides.

FIG. 2 is a fragmentary plan view of the polymer structure of FIG. 1 showing the spatial relationship between the end portions of the channel waveguides and the switching electrodes.

FIG. 3 is a broken-away perspective view of the polymer structure of FIG. 1.

BEST MODE OF CARRYING OUT THE INVENTION

As described in the aforementioned co-pending U.S. patent application Ser. No. 225,450, when certain non-linear optical polymer materials are "poled", i.e., when dipolar moieties of the constituent polymers of such materials are aligned, the indices of refraction of the materials are thereby altered. When a modulating electric field is applied to an electro-optic channel waveguide made of such a poled non-linear optical polymer material, field-dependent changes are superimposed upon the altered index of refraction. Thus, a phase-modulated optical signal can be transmitted through an electro-optic channel waveguide made of such a poled non-linear optical polymer by applying a modulating electric field to an optical carrier signal propagated through the channel waveguide.

One approach to the formation of electro-optic channel waveguides from poled non-linear optical polymer materials is discussed in *Electromagnetic Principles of Integrated Optics*, by D. L. Lee, (Wiley, N.Y., 1986), Chapter 7. The sequential steps of this process are set forth in the aforementioned U.S. Pat. No. 4,767,169.

A technique for forming an electro-optic channel waveguide in a non-linear optical polymer structure, whereby the waveguide properties are maintained without the continuous application of an electric field to the non-linear optical polymer structure, is disclosed in the aforementioned co-pending U.S. patent application Ser. No. 225,450.

The technique of patent application Ser. No. 225,450 involves the steps of: (1) maintaining an electric field in a channel portion of the polymer structure; (2) maintaining the polymer structure at a temperature in excess of the glass-transition temperature while the electric field is being maintained in the channel portion of the polymer structure, so that dipolar moieties of the polymer are aligned to produce a higher index of refraction in the channel portion than in non-channel portions of the polymer structure for at least one polarization; and (3) then cooling the polymer structure below the glass-transition temperature while continuing to maintain the electric field in the channel portion of the polymer structure, so that the aligned dipolar moieties remain aligned as they become non-mobile.

Most types of electro-optic channel waveguide switches, including a switch according to the present invention, depend on resonance or interference between optical modes to achieve input-to-output coupling between adjacent channel waveguides. However, electro-optic channel waveguide switches of the two-output type known in the prior art were generally designed so that only two optical modes would interact. Because of this, when operating parameters of the switch would vary from the optimum (due to, e.g., environmental changes, manufacturing variances, etc.), the optical signal in one output channel waveguide would leak to the other output channel waveguide, which would result in cross-talk between the two output channel waveguides. This is a profound problem, which becomes more significant as the number of channel waveguides and switches in the system becomes larger.

The present invention is illustrated in the drawing as a single-input, two-output type of switch, which supports three interacting optical modes. The optimum operating conditions produce a first-order null in the input channel waveguide, and a second-order null in the unselected one of the two output channel waveguides. The first-order effect of parameter variance increases coupling from the input channel waveguide only to the unguided output channel waveguide. Thus, as the temperature or other parameters vary, the switch becomes less efficient, but cross-talk does not increase.

When electro-optic channel waveguides are formed in a non-linear optical polymer structure by poling the polymer material in the regions that are to become the channel waveguides, the unpoled region of the polymer structure outside the channel waveguides becomes a cladding around the channel waveguides. The cladding and the channel waveguide regions are chemically identical. If the molecules of the polymer structure can be locally re-aligned, such as by spot heating, the dimensions of a channel waveguide formed in the polymer structure can be altered after the channel waveguide has been formed. In electro-optic channel waveguide switches of the prior art, which use junctions and bends, the lengths of poled-polymer channel waveguides cannot practcally be changed by this method. Since an electro-optic channel waveguide switch according to the present invention has parallel channel waveguides with no physical connections between them, the length of a particular channel waveguide (e.g., the input channel waveguide) can be changed, thereby causing a concomitant change in the region of interaction of that particular channel waveguide with an adjacent channel waveguide (e.g., with one of the output channel waveguides) after the switch has been produced, without needing to redefine the entire device. This allows post-production "trimming" of the switch to optimize performance.

Referring now to FIG. 1, an electro-optic channel waveguide switch according to the present invention is shown to consist of: a first electro-optic channel waveguide 2 formed in a non-linear optical polymer structure; a second electro-optic channel waveguide 4 formed in the same non-linear optical polymer structure in a spaced-apart position from the first channel waveguide 2; and a third electro-optic channel waveguide 6 formed in the same non-linear optical polymer structure in a spaced-apart position from the first channel waveguide 2, where the second and third channel waveguides 4 and 6 are substantially cop-planar with and are located on opposite sides of the first electro-optic channel waveguide 2. The non-linear optical polymer structure is supported by a substrate 8, and is isolated from the substrate 8 by a first buffer 10. Positioned between the substrate 8 and the first buffer 10, and spaced apart from each other, are a second electrode 12 and a third electrode 14, which correspond to the second channel waveguide 4 and the third channel waveguide 6, respectively. A first electrode 16 corresponding to the first channel waveguide 2 is also shown in FIG. 1, but is not a critical part of this invention. The first electrode 16 was utilized in the initial formation of the first channel waveguide 2, but serves no other function in the present invention. A second buffer 22 is separated from the first buffer 10 by the non-linear optical polymer material in which the first, second and third channel waveguides 2, 4 and 6, respectively, are formed. A fourth electrode 18 and a fifth electrode 18 and a fifth electrode 20, which correspond to the second channel waveguide 4 and the third channel waveguide 6, respectively, are positioned on the second buffer 22 in a spaced-apart relationship with respect to each other so that the fourth electrode 18 is aligned with the second channel waveguide 4 and the second electrode 12, and so that the fifth electrode 20 is aligned with the third channel waveguide 6 and the third electrode 14, As can be better understood by reference to FIG. 2 and FIG. 3, the first, second and third electro-optic channel waveguides 2, 4 and 6 are positioned so that an end portion of the first electro-optic channel waveguide 2 (which functions as the input channel waveguide) is disposed between end portions of the second and third electro-optic channel waveguides 4 and 6 (which function as output channel waveguides).

The electro-optic channel waveguide switch of the present invention utilizes resonant coupling between adjacent poled-polymer channel waveguides. Optical signals can be switched from the input channel waveguide 2 to a selected one of the output channel waveguides 4 and 6 by electro-optically perturbing the propagation constant of the selected output channel waveguide 4 or 6 of the polymer structure.

As shown in FIGS. 2 and 3, the three channel waveguides 2, 4 and 6 are shown as parallel poled-polymer channel waveguides, which are positioned with respect to each other within the polymer structure such that an end portion of the first channel waveguide 2 (i.e., the input channel waveguide) is interposed between end portions of the second and third channel waveguides 4 and 6 (i.e., the output channel waveguides), as illustrated in FIG. 2. The interposed portions of the channel waveguides 2, 4 and 6 include an active region and a passive region, which affect adjacent unpoled portions of the non-linear optical polymer structure around the channel waveguides 2, 4 and 6.

With particular reference to FIG. 3, the active region between the input channel waveguide 2 and the output channel waveguides 4 and 6 is defined by the pairs of electrodes associated with the output channel waveguides (i.e., the pair of electrodes 12 and 18 associated with the output channel waveguide 4, and the pair of electrodes 14 and 20 associated with the output channel waveguide 6). In operation, a particular one of the pairs of electrodes is used for electro-optically perturbing the propagation constant of the corresponding one of the output channel waveguides 4 and 6 that is selected. Thus, if the switch is used to select the channel waveguide 4 as the output channel, the electrodes 12 and 18 are energized to perturb the propagation constant of the channel waveguide 4; and if the switch is used to select the channel waveguide 6 as the output channel, the electrodes 14 and 20 are energized to perturb the propagation constant of the channel waveguide 6. The active region between the input channel waveguide 2 and the output channel waveguides 4 and 6 should be sized so as to provide a half-wave resonance between the input channel waveguide 2 and the output channel waveguides 4 and 6 when no voltage is applied to the switching electrodes 18 and 20.

The passive region between the input channel waveguide 2 and either one of the output channel waveguides 4 and 6 is that region located between the end portions of the adjacent waveguides, which is not affected by the application of a voltage to the switching electrodes 18 and 20. In the passive region, the propagation constant of the selected output channel waveguide is unaltered, which allows uninhibited resonance between the input channel waveguide 2 and the selected one of the output channel waveguides 4 and 6 for a length sufficient to establish efficient resonant coupling between the input channel waveguide 2 and the selected output channel waveguide 4 or 6.

The present invention has been described above in terms of a particular embodiment. However, other embodiments within the scope of the invention would become apparent to practitioners skilled in the art upon perusal of the foregoing specification and accompanying drawing. Accordingly, the invention is defined more generally by the following claims and their equivalents.

I claim:

1. An electro-optic channel waveguide switch for use with an apparatus that includes:

a) a structure substantially consisting of a non-linear optical polymer material, the polymer material in a first channel portion of said polymer structure being structured to define an input channel waveguide, the polymer material in a second channel portion and in a third channel poriton of said polymer structure being structured to define a pair of output channel waveguides, said polymer material in said channel portions of said polymer structure that define said input and output channel waveguides having a higher index of refraction in said channel portions of said polymer structure than in a portion of said polymer structure adjacent said channel portions, said higher index of refraction in said channel portions of said polymer structure being sufficient to support a guided mode of optical radiation of at least one polarization in said channel portions of said polymer structure defining said input and output channel waveguides, said higher index of refraction in said channel portions of said polymer structure being changeable by an applied electric field, said input and output channel waveguides being positioned with respect to each other so that an end portion of said input channel waveguide is disposed between end portions of said pair of output channel waveguides;

b) a first electrically insulating buffer located on a first side of said polymer structure; and c) a second electrically insulating buffer located on a second side of said polymer structure;

said switch comprising: a first pair of electrodes positioned on opposite sides of said second channel portion of said polymer structure; a second pair of electrodes positioned on opposite sides of said third channel poriton of said polymer structure; one electrode of said first pair of electrodes being separated from said second channel portion of said polymer structure by said first buffer, and the other electrode of said first pair of electrodes being separated from said second channel portion by said second buffer; one electrode of said second pair of electrodes being separated from said third channel portion of said polymer structure by said first buffer, and the other electrode of said second pair of electrodes being separated from said third channel portion by said second buffer; and means for applying a modulating electric field selectively between either of said first and second pairs of electrodes so as to superimpose field-dependent changes selectively upon the higher index of refraction in either of said output channel waveguides, thereby enabling an optical radiation signal propagated in said input channel waveguide to be selectively switched to either of said output channel waveguides.

2. The electro-optic channel waveguide switch of claim 1 wherein said polymer material in said channel poritons defining said channel waveguides is poled to produce said higher index of refraction in said channel portions than in said portion adjacent said channel portions.

* * * * *